United States Patent [19]

Somers

[11] Patent Number: 5,247,412
[45] Date of Patent: Sep. 21, 1993

[54] THIN-FILM MAGNETIC HEAD

[75] Inventor: Gerardus H. J. Somers, Eindhoven, Netherlands

[73] Assignee: U.S. Philips Corporation, New York, N.Y.

[21] Appl. No.: 725,093

[22] Filed: Jul. 2, 1991

[30] Foreign Application Priority Data

Jul. 18, 1990 [NL] Netherlands .......................... 9001629

[51] Int. Cl.⁵ .............................................. G11B 5/127
[52] U.S. Cl. .................................................. 360/113
[58] Field of Search ........................ 360/113; 338/32 R

[56] References Cited

U.S. PATENT DOCUMENTS 5,097,372 3/1992 Fukazawa ........................... 360/113

FOREIGN PATENT DOCUMENTS 411914 2/1991 European Pat. Off. .

Primary Examiner—Craig E. Church
Attorney, Agent, or Firm—John C. Fox

[57] ABSTRACT

With a thin-film magnetic head (20) having a flux conductor (21) and a magneto-resistance element (28) the flux conductor is divided into a plurality of flux conductor portions (23) which are spaced apart along the length (25) by a distance (27). This accomplishes a decrease in the mechanical tensions in the flux conductor (21) as a result of which a signal to be read is distorted to a lesser extent.

3 Claims, 2 Drawing Sheets

THIN-FILM MAGNETIC HEAD

BACKGROUND OF THE INVENTION

The invention relates to a thin-film magnetic head having a head face, for cooperation with a magnetic recording medium, and a magnetic yoke, comprising a magneto-resistance element and at least one flux conductor having a dimension in a direction perpendicular to the head face. An example of a recording medium is a magnetic tape.

Such a magnetic head is inter alia disclosed in JP 62-241119 (A). In this known magnetic head the flux conductor is contiguous to the head face and in addition to the flux conductor and the magneto-resistance element, the magnetic yoke includes a further flux conductor and a magnetic substrate. A reading gap is present between the substrate and the flux conductor contiguous to the head face. In thin-film magnetic heads it is customary to choose the width of the flux conductor equal to the gap width. When wide read gaps, for example of the type used in magnetic heads for reading analog signals are used, an unwanted great distortion of the signal to be read occurs.

OBJECTS AND SUMMARY OF THE INVENTION

One object of the invention is to provide a thin-film magnetic head in which the distortion of the signal to be read is significantly less than with the prior art thin-film magnetic head. To that end, the thin-film magnetic head according to the invention, is characterized in that the flux conductor is divided into at least two flux conductor portions which are located in the same plane and are spaced apart along at least substantially the whole of said dimension. By dividing the flux conductor, the mechanical tensions in the flux conductor are reduced, which decreases the distortions of the signal read.

An embodiment of the thin-film magnetic head of the invention, which can be manufactured in a simple manner and which highly reduces the mechanical tensions, is characterized in that the flux conductor portions are spaced apart from each other along an interface along the whole of said dimension, this interface extending perpendicularly to the head face. This provides a further improvement of the signal read.

A further embodiment of the thin-film magnetic head according to the invention in which the flux conductor is contiguous to the head face and the yoke includes a second flux conductor which, taken in a direction perpendicular to the head face, is remote from the first flux conductor and in which the magneto-resistance element bridges the two flux conductors, is characterized in that also the second flux conductor is divided in a manner corresponding to that of the said first flux conductor into at least two further flux conductor portions. Experiments have shown that mechanical tensions resulting in a distortion of the signal to be read also occur in the second flux conductor. By dividing also this second flux conductor, also these mechanical tensions and the distortions caused thereby are reduced.

BRIEF DESCRIPTION OF THE DRAWING

The invention will now be described by way of example in greater detail with reference to embodiments of the thin-film magnetic head in accordance with the invention shown in the accompanying Figures. Therein.

DESCRIPTION OF THE PREFERRED EMBODIMENTS

Figure 1:
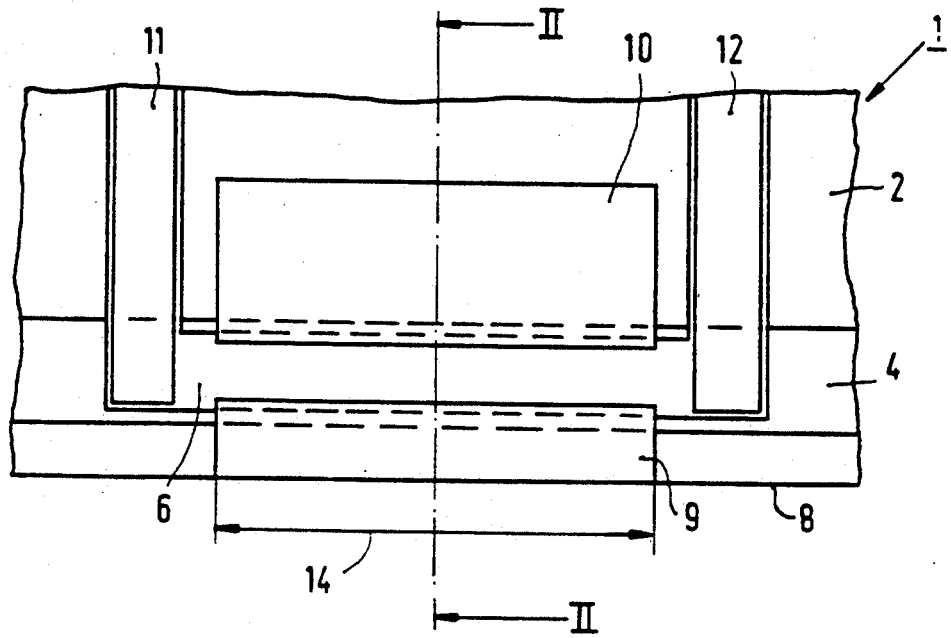
FIG. 1 shows the structure of a prior art thin-film magnetic head.
Figure 2:
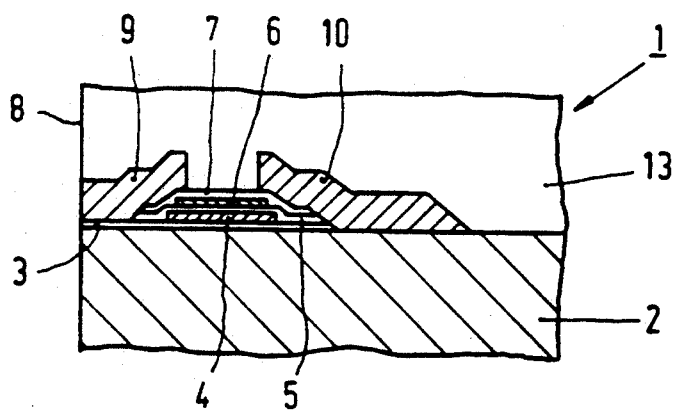
FIG. 2 is a cross-sectional view of the prior art thin-film magnetic head.

FIG. 1 illustrates the structure of a prior art thin-film magnetic head and FIG. 2 is a cross-sectional view thereof. The known magnetic head 1 is assembled from a magnetic substrate 2 onto which a non-magnetic gap layer 3 is provided, a bias conductor 4, a first insulating layer 5, a magneto-resistance element 6, a second insulating layer 7 and a first flux conductor 9 contiguous to a head face 8, and, taken in a direction away from the head face, a second flux conductor 10 located remote therefrom. The magneto-resistance element forms a magnetic bridge between the two flux conductors and together with these flux conductors and the substrate forms a magnetic yoke. In this situation ends of the flux conductors 9, 10 partly overlap the magneto-resistance element 6. A read gap which is filled up by the gap layer 3 is situated between the substrate 2 and the flux conductor 9 which is contiguous to the head face. Electric conductors 11 and 12 for connection to signal-processing means are provided on the magneto-resistance element 6. The magnetic head structure is coated with a thick protecting layer 13. With thin-film magnetic heads it is customary to make the width 14 of the flux conductor 9 equal to the gap width. However, magnetic heads are also known in which the gap width is less than the width of the flux conductor. This occurs, for example, when a thick gap layer is provided on the substrate, which layer, in the region of the gap to be formed, is of a thinner structure through a distance equal to the width of the gap to be formed. The flux conductor is provided on the thinner portion and the edges of the flux conductor are located on the thick portion of the gap layer. In this case the gap width is determined by the dimension of the thinner portion of the gap layer, what is commonly denoted the "gap groove", and not by the width of the flux conductor.

Figure 3:
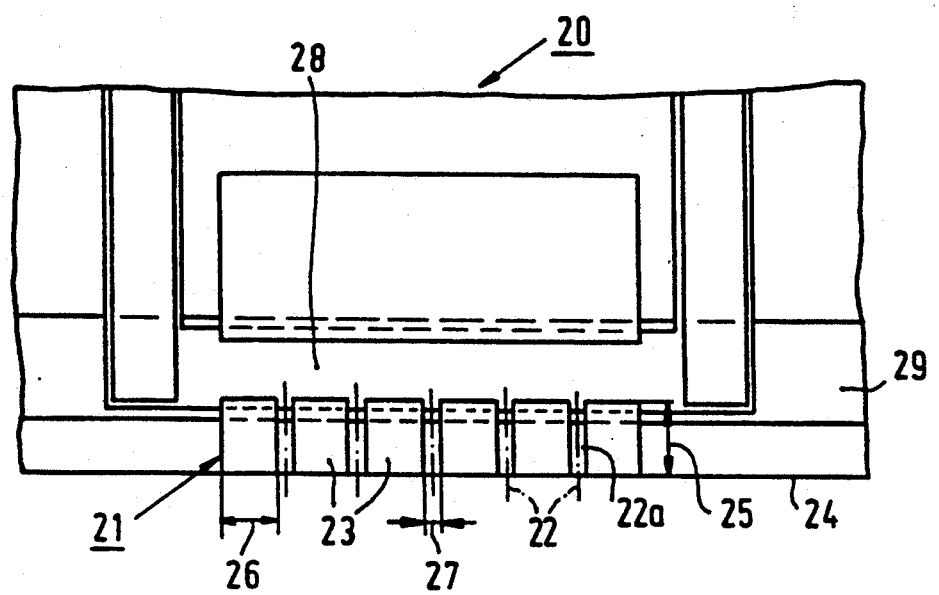
FIG. 3 illustrates the structure of a first embodiment of the thin-film magnetic head according to the invention.

However, in both cases, with wide flux conductors, for example conductors of the type used in magnetic heads for reading analog signals, mechanical tensions are produced in the flux conductors. This results in a distortion of the signal to be read. So as to reduce the mechanical tensions, the flux conductor is divided into flux conductor portions. FIG. 3 shows the structure of a first embodiment of the thin-film magnetic head 20 in accordance with the invention having a flux conductor 21 which is divided into flux conductor portions. Along imaginary interfaces 22, the flux conductor 21 is divided into flux conductor portions 23, which are all located in one plane. The interfaces 22 extend perpendicularly to the head face 24, recesses 22a separating the flux conductor portions 23 along the overall length 25. From measurements it was found that if the flux conductor 21, made as one integral whole having a width of 600 $\mu$m, is divided into six flux conductor portions 23, each having a width 26 of 95 $\mu$m and spaced apart by distances 27 of 6 μm, the distortion is improved by approximately 25 dB.

With thin-film magnetic heads having a magneto-resistance element, for reading, for example, analog signals, a negative feedback is often used to prevent the flux conductors and the magneto-resistance element from being driven too highly. A condition for an adequate functioning of this negative feedback is that the signal transfer of the read flux to magneto-resistance element 28 is comparable to the transfer between bias conductor 29 and the magneto-resistance element 28. A flux conductor 9 made as one integral whole (see FIG. 1), having a width of, for example, 600 μm can hardly satisfy this condition. By splitting the flux conductor entirely or partly, this condition can be satisfied without any problems and the envisaged improvement of the signal to be read can be achieved.

Figure 4:
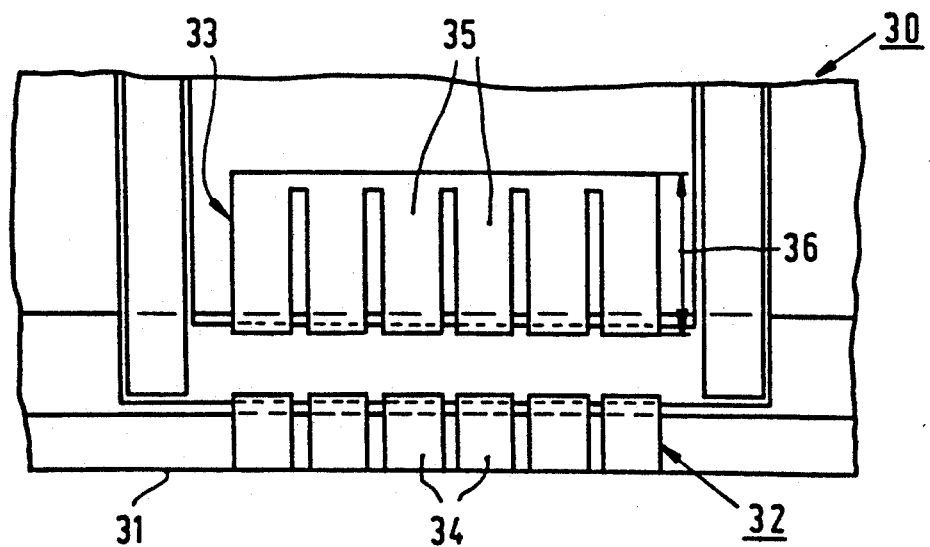
FIG. 4 shows the structure of a second embodiment of the thin-film magnetic head in accordance with the invention.

FIG. 4 shows the structure of a second embodiment of the thin-film magnetic head 30 of the invention. In this structure, both a flux conductor 32 contiguous to the head face 31 and a further flux conductor 33 remote therefrom are divided into flux conductor portions 34 and further flux conductor portions 35, respectively. These further flux conductor portions 35 are separated from each other along the major portion of their length 36. Also in this case it is possible to separate the further flux conductor portions 35 along the overall length 36.

It should be noted that the invention is not limited to the embodiments shown here, but extends to any possible embodiment within the framework defined by the claims. Thus, it is not necessary for the flux conductor to be contiguous to the head face. The flux conductor may alternatively be located remotely from the head face, as in the magnetic head disclosed in U.S. Pat. No. 4,617,600, incorporated herein by reference. It is also not necessary for the substrate to be made of a magnetically conducting material. The substrate may be non-magnetic, a magnetic head having only one pole (constituted by the flux conductor) then being obtained, instead of two poles (constituted by the flux conductor and the substrate). Also in this case a magnetic layer which then acts as a second pole, can be provided onto the non-magnetic substrate. The presence of a bias conductor is also not necessary. It may optionally be omitted.

The interfaces may alternatively extend at a different angle, differing from 90 degrees, relative to the head face. Also separations along a curved interface or along an interface having an angle therein can be used. It is alternatively possible to divide, for example, only the further flux conductor and not the flux conductor contiguous to the head face. This also achieves a reduction in the distortion of the signal to be read.

The embodiments shown here of the thin-film magnetic head in accordance with the invention are all of what is commonly denoted as the "yoke" type, in which the magneto-resistance element bridges two spaced-apart flux conductors. The invention is however also suitable for use in thin-film magnetic heads of the so-called "shielded" type, in which one contiguous flux conductor is present on the magneto-resistance elements. U.S. Pat. No. 4,729,048, incorporated herein by reference discloses an example of such a head structure. The invention is also suitable for use in thin-film magnetic heads in which the read portion with magneto-resistance element is combined with an inductive read portion as shown in, for example, JP 62-145527(A).

The invention can also be used with thin-film magnetic heads suitable for reading digital signals, in which the gap width is usually less than in thin-film magnetic heads for reading analog signals. Also, with thin-film magnetic heads having flux conductors of a smaller width, an improvement of the signal to be read can be obtained by dividing the flux conductors.

I claim:

1. A thin-film magnetic head having a head face, for cooperation with a magnetic recording medium, and a magnetic yoke, comprising a magneto-resistance element and at least one flux conductor having a dimension in a direction perpendicular to the head face, characterized in that the flux conductor is divided into at least two flux conductor portions, which are located in the same plane, are spaced apart along at least substantially the whole of said dimension and have opposing surfaces facing only each other along at least substantially the whole of said dimension.

2. A thin-film magnetic head as claimed in claim 1, characterized in that the flux conductor portions are located spaced apart from each other, along an interface along the whole of said dimension, the interface extending perpendicularly to the head face.

3. A thin-film magnetic head having a head face for cooperation with a magnetic recording medium, and a magnetic yoke, said yoke comprising a magneto-resistance element, a first flux conductor contiguous to the head face and having a dimension perpendicular to the head face, a second flux conductor, which, taken in a direction perpendicular to the head face, is remote from the first flux conductor, and having a dimension perpendicular to the head face, the magneto-resistance element magnetically bridging the first flux conductor and the second flux conductor, characterized in that the first flux conductor and the second flux conductor are each divided into at least two flux conductor portions, the portions of each flux conductor are located in the same plane, are spaced apart along at least substantially the whole of said dimension and have opposing surfaces facing only each other along at least substantially the whole of said dimension.

* * * * *